United States Patent
Wang et al.

(10) Patent No.: US 9,445,398 B2
(45) Date of Patent: Sep. 13, 2016

(54) SOUNDING REFERENCE SYMBOL SENDING METHOD, BASE STATION, AND USER EQUIPMENT

(71) Applicant: FUJITSU LIMITED, Kawasaki-shi, Kanagawa (JP)

(72) Inventors: Yi Wang, Beijing (CN); Yuantao Zhang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 14/146,441

(22) Filed: Jan. 2, 2014

(65) Prior Publication Data
US 2014/0119321 A1    May 1, 2014

Related U.S. Application Data (63) Continuation of application No. PCT/CN2011/077207, filed on Jul. 15, 2011.

(51) Int. Cl.
  *H04W 72/04* (2009.01)
  *H04L 5/00* (2006.01)
  *H04B 7/02* (2006.01)

(52) U.S. Cl.
  CPC ............ *H04W 72/04* (2013.01); *H04L 5/0035* (2013.01); *H04L 5/0048* (2013.01); *H04L 5/0094* (2013.01); *H04B 7/024* (2013.01)

(58) Field of Classification Search
  CPC .. H04W 72/04; H04L 5/0035; H04L 5/0048; H04L 5/0094; H04B 7/024
  USPC ......................................................... 370/329
  See application file for complete search history.

(56) References Cited

U.S. PATENT DOCUMENTS

| | | | |
|---|---|---|---|
| 2009/0274076 A1 | 11/2009 | Muharemovic et al. | |
| 2011/0098054 A1* | 4/2011 | Gorokhov et al. | 455/452.1 |

(Continued)

FOREIGN PATENT DOCUMENTS

| | | |
|---|---|---|
| CN | 101808409 | 8/2010 |
| CN | 101827444 | 9/2010 |

(Continued)

OTHER PUBLICATIONS

International search report issued for corresponding international patent application No. PCT/CN2011/077207, mailed Apr. 19, 2012.

(Continued)

*Primary Examiner* — Huy D Vu
*Assistant Examiner* — Nizam Ahmed
(74) *Attorney, Agent, or Firm* — Myers Wolin, LLC (57) ABSTRACT

A method for transmitting sounding reference symbol, a base station and user equipment. The method comprises: configuring, by a base station, user equipment of a CoMP transmission mode, with parameter configuration information for transmitting SRS, the parameter configuration information including a frequency comb of the SRS and one or more pieces of the following information: cyclic shift, root sequence information, power control information, and transmission duration information, of the SRS; and transmitting the parameter configuration information to the user equipment by the base station, such that the user equipment transmits the SRS to the base station according to the parameter configuration information. The method is simple and flexible, efficiently uses limited SRS resources, and solves the problem in the prior art.

10 Claims, 7 Drawing Sheets

(56) References Cited

U.S. PATENT DOCUMENTS

2012/0051265 A1    3/2012  Shen et al.
2012/0149297 A1    6/2012  Suh et al.
2013/0294382 A1*  11/2013  Xu et al. .................... 370/329

FOREIGN PATENT DOCUMENTS

| CN | 101867938 A | | 10/2010 |
|---|---|---|---|
| EP | 2 424 285 A1 | | 4/2010 |
| EP | 2424285 A1 | * | 2/2012 |
| JP | 2013-513311 A | | 4/2013 |
| KR | 10-2011-0018803 A | | 2/2011 |
| WO | 2010/121538 A1 | | 10/2010 |
| WO | 2010/124241 A2 | | 10/2010 |
| WO | 2011/068995 A2 | | 6/2011 |

OTHER PUBLICATIONS

Extended European search report with supplementary European search report and the European search opinion issued for corresponding European Patent Application No. 11869672.3, mailed on Feb. 5, 2015.
Notice of Preliminary Rejection issued for corresponding Korean Patent Application No. 10-2014-7000606, mailed on Nov. 20, 2014, with English translation.
3GPP TS 36.213 V10.2.0, "3rd Generation Partnership Project; Technical Specification Group Radio Access Network; Evolved Universal Terrestrial Radio Access (E-UTRA); Physical layer procedures (Release 10)", Jun. 2011.
Office Action issued by the Japan Patent Office for corresponding Japanese Patent Application No. 2014-519374, mailed on Sep. 1, 2015, with an English translation.
Alcatel-Lucent et al., "Summary of SRS Enhancements", Agenda Item: 6.5.2.2, 3GPP TSG-RAN WG1 Meeting #62, R1-104406, Madrid, Spain, Aug. 23-27, 2010.
Motorola, "Views on SRS Enhancements for LTE-A", Agenda Item: 6.5.2, 3GPP TSG-RAN WG1 Meeting #60bis, R1-102142, Beijing, China, Apr. 12-16, 2010.
Catt et al., "Considerations on Enhanced SRS Transmission Schemes", Agenda Item: 7.2.4.3, 3GPP TSG-RAN WG1 Meeting #59bis, R1-100023, Valencia, Spain, Jan. 18-22, 2010.
First Notification of Office Action issued by the State Intellectual Property Office of China for corresponding Chinese Patent Application No. 201180070881.9, dated Mar. 11, 2016, with an English translation.

* cited by examiner

SOUNDING REFERENCE SYMBOL SENDING METHOD, BASE STATION, AND USER EQUIPMENT

CROSS-REFERENCE TO RELATED APPLICATIONS

This is a continuation of International Application No. PCT/CN2011/077207, filed on Jul. 15, 2011, now pending, the contents of which are herein wholly incorporated by reference.

TECHNICAL FIELD

The present invention relates to the field of wireless communications, and in particular to a method for transmitting sounding reference symbol, a base station and user equipment in a coordinated multiple point mode.

BACKGROUND ART

In an advanced long-term evolution (LTE-advanced) system, in order to increase throughput of a cell-edge user, much attention is paid to a coordinated multiple point (CoMP) transmission technology.

Figure 1:
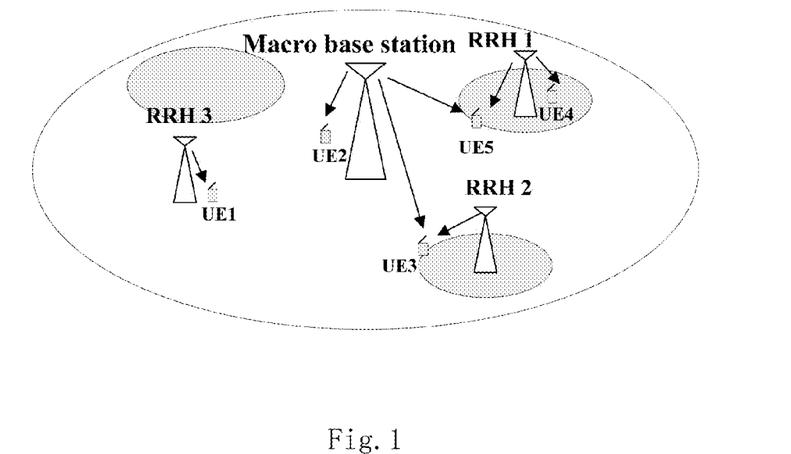
FIG. 1 is a schematic diagram of a CoMP transmission scenario within the same cell based on RRHs.
Figure 2:
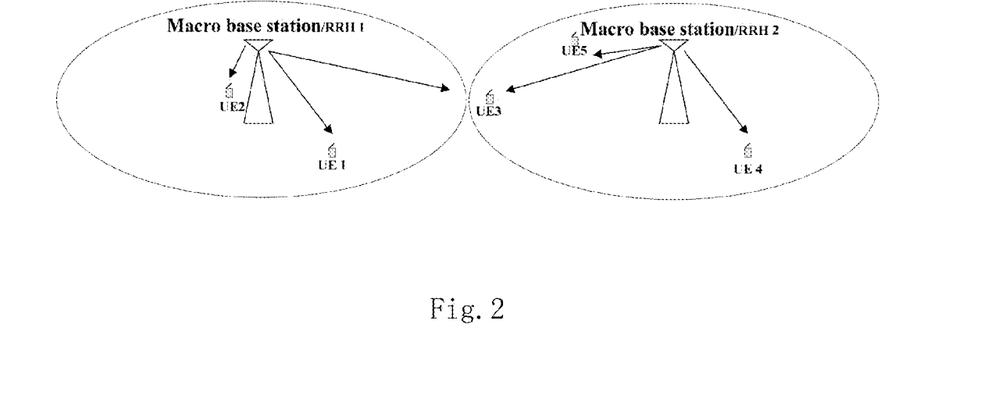
FIG. 2 is a schematic diagram of a CoMP transmission scenario within the different cells based on RRHs.

FIG. 1 is a schematic diagram of a CoMP transmission scenario within a same cell based on remote radio heads (RRHs), and FIG. 2 is a schematic diagram of a CoMP transmission scenario within different cells based on RRHs. It can be seen from FIGS. 1 and 2 that different transmission points within the same cell may perform coordinated transmission, and different transmission points within the different cells may also perform coordinated transmission.

In CoMP transmission, in order to select an optimal set of coordinated points, a base station side needs to obtain information on downlink channels from each transmission point to a user. In order to obtain information on downlink channels from each transmission point to a user, following method may be used: user equipment transmits a sounding reference symbol (SRS), and each point of the base station side receives the SRS at the same time, uplink channels from the user equipment to each receiving point is calculated at the base station side, and hence information on downlink channels from each transmission point to the user equipment is calculated.

However, in the implementation of the present invention, the inventors found that following defect exists: in order to support multiple pieces of user equipment transmits SRSs at the same time, different frequency domain resources may be occupied, for example, different subbands may be occupied, or different frequency combs may be occupied, or different codeword resources, such as cyclic shift (CS), may be occupied. However, in an existing system, at most 2 frequency combs and 8 CSs may be supported. When different transmission points within the same cell perform CoMP transmission, capacity of an SRS is limited as increase of the number of users and multipoint reception of the SRS, and gain of downlink CoMP transmission will be affected. There is no effective solution for the above problem.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of the present invention is to provide a method for transmitting SRS, a base station and user equipment. As for a CoMP transmission mode, the base station side configures the user equipment with parameter configuration information for transmitting an SRS, thereby efficiently using limited SRS resources and solving the problem in the prior art.

According to an aspect of the embodiments of the present invention, there is provided a method for transmitting SRS, including:

configuring, by a base station, user equipment of a CoMP transmission mode, with parameter configuration information for transmitting SRS, the parameter configuration information including a frequency comb of the SRS and one or more pieces of the following information: cyclic shift, root sequence information, power control information, and transmission duration information, of the SRS; and transmitting, by the base station, the parameter configuration information to the user equipment, such that the user equipment transmits the SRS to the base station according to the parameter configuration information.

According to another aspect of the embodiments of the present invention, there is provided a method for transmitting SRS, including:

receiving, by user equipment configured to enter a CoMP transmission mode, parameter configuration information transmitted by a base station, the parameter configuration information including a frequency comb of the SRS and one or more pieces of the following information: cyclic shift, root sequence information, power control information, and transmission duration information, of the SRS; and transmitting, by the user equipment, the SRS to the base station according to the parameter configuration information.

According to a further aspect of the embodiments of the present invention, there is provided a base station, including:

an information configurator, configured to configure, user equipment of a CoMP transmission mode, with parameter configuration information for transmitting SRS, the parameter configuration information including a frequency comb of the SRS and one or more pieces of the following information: cyclic shift, root sequence information, power control information, and transmission duration information, of the SRS; and a first information transmitter, configured to transmit the parameter configuration information to the user equipment, such that the user equipment transmits the SRS to the base station according to the parameter configuration information.

According to a further aspect of the embodiments of the present invention, there is provided user equipment configured to be in a CoMP transmission mode, the user equipment including:

an information receiver, configured to receive parameter configuration information transmitted by a base station, the parameter configuration information including a frequency comb of a SRS and one or more pieces of the following information: cyclic shift, root sequence information, power control information, and transmission duration information, of the SRS; and a second information transmitter, configured to transmit SRS to the base station according to the parameter configuration information.

According to still another aspect of the embodiments of the present invention, there is provided a computer-readable program, wherein when the program is executed in a base station, the program enables a computer to carry out the method for transmitting SRS as described above in the base station.

According to still another aspect of the embodiments of the present invention, there is provided a storage medium in which a computer-readable program is stored, wherein the computer-readable program enables a computer to carry out the method for transmitting SRS as described above in a base station.

According to still another aspect of the embodiments of the present invention, there is provided a computer-readable program, wherein when the program is executed in user equipment, the program enables a computer to carry out the method for transmitting SRS as described above in the user equipment.

According to still another aspect of the embodiments of the present invention, there is provided a storage medium in which a computer-readable program is stored, wherein the computer-readable program enables a computer to carry out the method for transmitting SRS as described above in user equipment.

The advantages of the embodiments of the present invention reside in that as for a CoMP transmission mode, a base station side configures user equipment with parameter configuration information for transmitting an SRS, thereby efficiently using limited SRS resources and solving the problem in the prior art.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The above and other objects, features and advantages of the embodiments of the present invention will become more obvious from the following detailed description with reference to the accompanying drawings. In the drawings.

DETAILED DESCRIPTION OF THE INVENTION

Various embodiments of the present invention shall be described below with reference to the drawings. These embodiments are illustrative only, and are not intended to limit the present invention. For easy understanding of the principle and embodiments of the present invention by those skilled in the art, the embodiments of the present invention shall be described taking a CoMP mode in an LTE/LTE-A system as an example. However, it should be understood that the present invention is not limited to said system, and is applicable to any other system relating to transmission of an aperiodic SRS.

Figure 3:
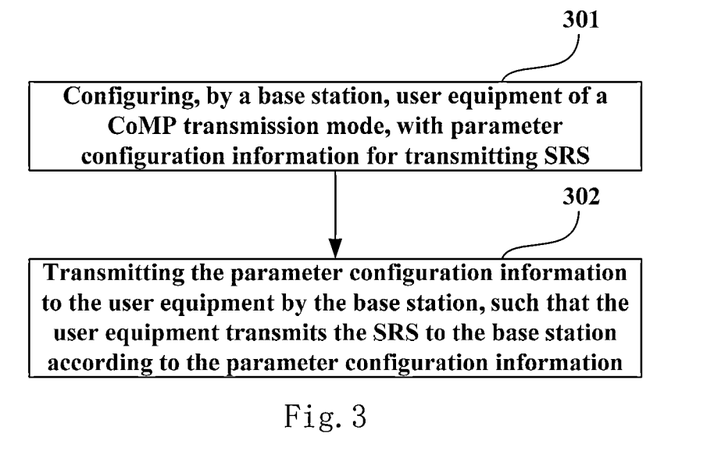
FIG. 3 is a flowchart of the method for transmitting SRS of Embodiment 1 of the present invention.

FIG. 3 is a flowchart of the method for transmitting SRS of Embodiment 1 of the present invention. As shown in FIG. 3, at a base station side, the method includes:

step 301: configuring, by a base station, user equipment of a CoMP transmission mode, with parameter configuration information for transmitting SRS, the parameter configuration information including a frequency comb of the SRS and one or more pieces of the following information: cyclic shift, root sequence information, power control information, and transmission duration information, of the SRS; and step 302: transmitting, by the base station, the parameter configuration information to the user equipment, such that the user equipment transmits the SRS to the base station according to the parameter configuration information.

In this embodiment, for the CoMP transmission mode, a parameter value of said parameter configuration information is different from a parameter value of an SRS in a non-CoMP transmission mode; furthermore, root sequence information of SRSs of user equipment of different CoMP sets within a same cell may be different, and root sequence information of SRSs of user equipment of a same CoMP set within the same cell may be identical.

Furthermore, the transmission duration may be set as multiple, thereby improving accuracy of channel measurement.

It can be seen from the above embodiment that the base station side configures for the user equipment enter a CoMP transmission mode with parameter configuration information for transmitting an SRS, thereby efficiently using limited SRS resources and solving the problem in the prior art, with the manner of configuration being simple and flexible.

Figure 4:
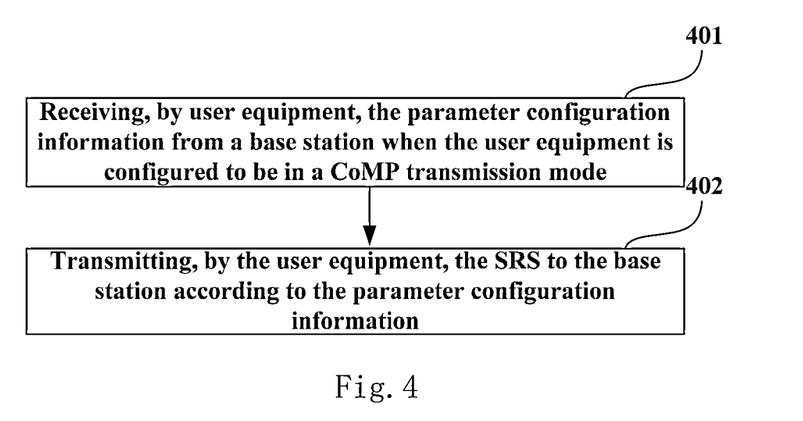
FIG. 4 is a flowchart of the method for transmitting SRS of Embodiment 2 of the present invention.

FIG. 4 is a flowchart of the method for transmitting SRS of Embodiment 2 of the present invention. As shown in FIG. 4, at user equipment side, the method includes:

step 401: receiving, by user equipment, parameter configuration information transmitted by a base station, when the user equipment is configured to be in a CoMP transmission mode, the parameter configuration information including a frequency comb of the SRS and one or more pieces of the following information: cyclic shift, root sequence information, power control information, and transmission duration, of the SRS;

In this embodiment, the user equipment may be explicitly or impliedly configured to be in the CoMP transmission mode; for example, the user equipment is notified by high-layer signaling to enter the CoMP transmission mode, that is, a new transmission mode is defined for the CoMP; or the user equipment is impliedly entered into the CoMP transmission mode by configuring the user equipment with a feedback mode;

step 402: transmitting, by the user equipment, the SRS to the base station according to the parameter configuration information.

In the above embodiment, the parameter configuration information may further include cyclic information of the SRS and bandwidth information of the SRS, etc.; however, it is not limited to said information, and other information may be included as actually required.

It can be seen from the above embodiment that the user equipment configured to be in the CoMP transmission mode receives the parameter configuration information for transmitting an SRS configured by the base station, and transmit the SRS according to the parameter configuration information, thereby efficiently using limited SRS resources and solving the problem in the prior art, with the manner of configuration being simple and flexible.

In this embodiment, the base station may trigger the transmission of the SRS and indicate the parameter configuration information to the user equipment by generating new downlink control information (DCI) for indicating parameter configuration; or the base station may notify the parameter configuration information by using specific high-layer signaling designed for user equipment operating in the CoMP mode, trigger the transmission of the SRS by using DCI and indicate the parameter configuration information to the user equipment. The method for transmitting SRS shall be described in detail in embodiments 3 and 4 below taking that the user equipment is triggered in the above two manners to transmit an aperiodic SRS as examples.

Figure 5:
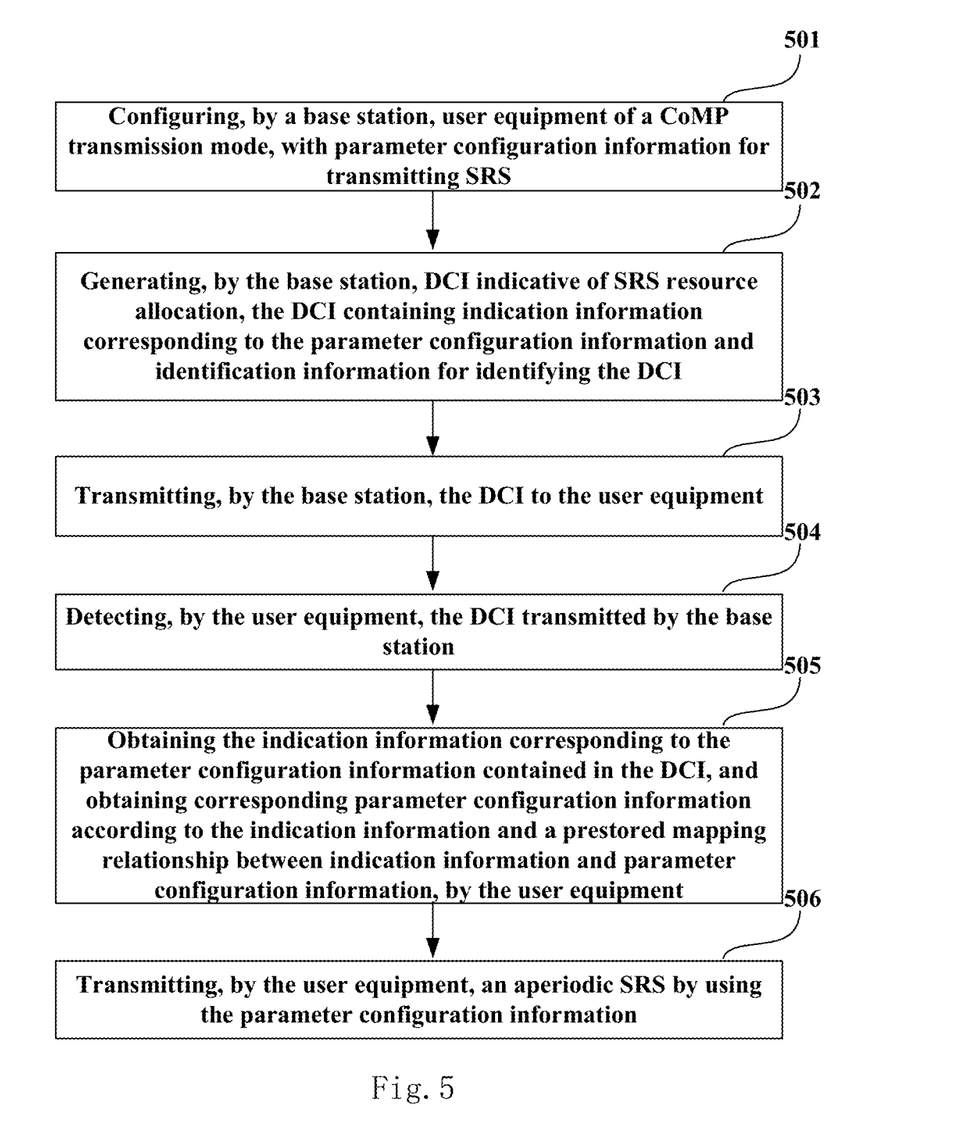
FIG. 5 is a flowchart of the method for transmitting SRS of Embodiment 3 of the present invention.

FIG. 5 is a flowchart of the method for transmitting SRS of Embodiment 3 of the present invention. As shown in FIG. 5, at a base station side, the method includes:

step 501: configuring, by a base station, user equipment of a CoMP transmission mode, with parameter configuration information for transmitting SRS;

In this embodiment, for example, the parameter configuration information includes cyclic information of the SRS, bandwidth information of the SRS, a frequency comb of the SRS, cyclic shift of the SRS, root sequence information of the SRS, power control information of the SRS, and transmission duration information of the SRS;

What described above is an embodiment of the present invention only, and one or more pieces of the above parameter configuration information may be configured as actually required;

step 502: generating, by the base station, DCI indicative of SRS resource allocation, the DCI containing indication information corresponding to the parameter configuration information and identification information for identifying the DCI;

Wherein, the DCI may be carried by a physical downlink control channel (PDCCH).

The base station may contain the indication information corresponding to the parameter configuration information in the DCI for transmitting to the user equipment, according to mapping relationship between the preset parameter configuration information and the indication information; in this way, in receiving the DCI, the user equipment may find out corresponding parameter configuration information according to the indication information and the mapping relationship between the parameter configuration information and the indication information, and then transmit the SRS according to the parameter configuration information.

In this embodiment, the above generated DCI further includes identification information for identifying the DCI, that is, the DCI is identified as the DCI indicative of the SRS parameters; wherein, the above generated DCI may be the same as existing DCI with respect to length, and may be identified by an identification bit, so as to be differentiated from existing DCI.

Figure 6:
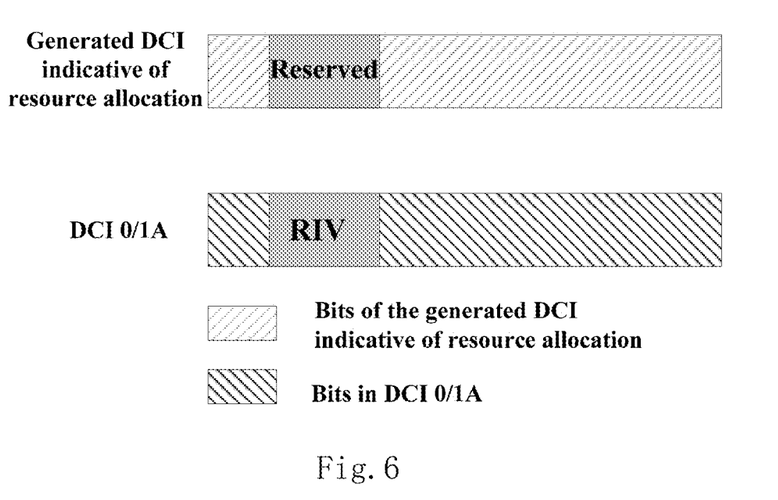
FIG. 6 is a schematic diagram of identification-generated DCI and an existing DCI0/1A.

For example, a redundant bit in the DCI may be taken as the identification information, so as to be differentiated from existing DCI; and preferably, a redundant bit in existing DCI may use an unused code point in a resource indication value (RIV) as indication, that is, if the former M bits in the RIV are all 1, it indicates that the DCI is the above generated DCI; otherwise, it is existing DCI 0/1A. As shown in FIG. 6, in which a schematic diagram of identification-generated DCI and an existing DCI0/1A is shown; wherein, for new DCI for SRS resource allocation, the identification information is denoted by reserved bits; for example, if, "xxxx . . . xx"="11xx . . . xx", that is, the former two bits are 1, namely, "11", it can be seen that the DCI is new DCI, which is used to indicate to transmit SRS parameter configuration information; and if "xxxx . . . xx"="01xx . . . xx" or "00xx . . . xx" or "10xx . . . xx", it can seen from "xxxx . . . xx" that the DCI is DCI 0/1A, and the RIV is used for PDSCH or PUSCH resource allocation.

The above manner of indication is an embodiment of the present invention only, and the DCI may also be identified by using other manners.

In this embodiment, for a CoMP transmission mode, the parameter value of the above parameter configuration information may be different from an SRS parameter value in a non-CoMP transmission mode.

For example, in the non-CoMP transmission mode, the frequency comb information is 1 bit, and its value is taken as 0 or 1; while in the CoMP transmission mode, the frequency comb information is 2 bits, and its value is taken as 0, 1, 2 or 3, as shown in Table 1, which shows mapping relationship between indication information in the DCI and the frequency comb.

TABLE 1

| Indication information to which the frequency comb in the DCI corresponds | Frequency comb of the SRS |
| --- | --- |
| 00 | 0 |
| 01 | 1 |
| 10 | 2 |
| 11 | 3 |

For example, in the non-CoMP transmission mode, the CS of the SRS is 2 bits, and its value is taken as 00, 01, 10 or 11; while in the CoMP transmission mode, the CS is 4 bits, and its value is taken as 0, 1, 2, . . . or 11, as shown in Table 2, which shows mapping relationship between indication information in the DCI and the CS of the SRS.

TABLE 2

| Indication information to which the CS in the DCI corresponds | CS of the SRS |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | Reserved |
| 1101 | Reserved |
| 1110 | Reserved |
| 1111 | Reserved |

For example, in the CoMP transmission mode, Table 3 shows mapping relationship between indication information of transmission duration in the DCI and transmission duration (that is, times of transmission) of aperiodic SRS.

TABLE 3

| Indication information to which the transmission duration in the DCI corresponds | Transmission duration of SRS (aperiodic SRS) |
|---|---|
| 00 | Triggered for one time, the SRS is transmitted once (single shot) |
| 01 | Triggered for one time, the SRS is transmitted for M1 times (M1 shots (multiple shots)) |
| 10 | Triggered for one time, the SRS is transmitted for M2 times (M2 shots (Multiple shots)) |
| 11 | Triggered for one time, the SRS is transmitted for M3 times (M3 shots (multiple shots)) |

For example, in the non-CoMP transmission mode, the power control information is fast power control information identical to the PUSCH; while in the CoMP transmission mode, the above generated DCI contains fast power control information specifically designed for SRSs, as shown in Table 4, which shows mapping relationship between indication information to which the power control in the DCI corresponds and the power control information of the SRS; wherein, Mi in Table 4 is a positive integer, and maximum transmission power of a user may be obtained by using the formula below:

$$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i) + f_{comp}(i)\}$$

Where, $f_{comp}(i)$ is a power control component given in the table.

Furthermore, $P_{CMAX,c}(i)$ is the maximum transmission power of the user, $P_{SRS\_OFFSET,c}(m)$ is SRS transmission power offset, which is semi-statically configured by high-layer signaling, $M_{SRS,c}$ is a transmission bandwidth of the SRS, $P_{O\_PUSCH,c}$ is semi-statically configured PUSCH power adjustment, $\alpha_c$ is a compensation factor of pathloss, $PL_c$ is downlink pathloss, and $f_c(i)$ is close-loop fast power control adjustment indicated by uplink scheduling DCI/power control DCI.

TABLE 4

| Indication information to which the power control in the DCI corresponds | Power control of SRS |
|---|---|
| 00 | −M1 |
| 01 | 0 |
| 10 | M1 |
| 11 | M2 |

For example, in the non-CoMP transmission mode, the root sequence information is a UE-specific root sequence, that is, all the users in a cell use identical SRS sequences; in the CoMP transmission mode, Table 5 shows mapping relationship between indication information to which the root sequence information of SRS in the DCI corresponds and the root sequence information of the SRS.

TABLE 5

| Indication information in the DCI to which the root sequence corresponds | Root sequence of SRS |
|---|---|
| 0 | All the users in a cell use identical SRS sequences (associated with cell-ID) |
| 1 | All the users in the same CoMP set use identical SRS sequences (associated with CoMP set ID) | step 503: transmitting the DCI by the base station to the user equipment.

In this way, when the user equipment is configured with a CoMP transmission mode, the user equipment will detect the DCI, read the indication information corresponding to the parameter configuration information by parsing the DCI, obtain corresponding parameter configuration information according to the indication information and a prestored mapping relationship between indication information and parameter configuration information (such as the mapping relationship shown in tables 1-5), and transmit an aperiodic SRS by using the parameter configuration information.

At the user equipment side, step 504: detecting, by the user equipment, the DCI transmitted by the base station when the user equipment configured with a CoMP transmission mode;

wherein, the DCI may be detected in a PDCCH search space by using indication information in identification bits, and it may learn that the DCI is detected if the indication information in the identification bits uses unused code points in the RIV and the former M bits in the RIV are 1;

step 505: parsing the DCI, obtaining the indication information corresponding to the parameter configuration information contained in the DCI, and obtaining corresponding parameter configuration information according to the indication information and a prestored mapping relationship between indication information and parameter configuration information, by the user equipment;

wherein, for example, mapping relationship tables, such as tables 1-5, may be looked up by using indication information, so as to obtain corresponding parameter configuration information.

step 506: transmitting, by the user equipment, an aperiodic SRS by using the parameter configuration information.

In this embodiment, the user equipment transmits the aperiodic SRS at a preset time according to the obtained parameter configuration information; wherein, the preset time may be a first UE-specific SRS subframe satisfying processing delay; if multiple times of transmission are configured, the aperiodic SRS needs to be continuously transmitted for multiple times, and the preset time may be a first UE-specific SRS subframe satisfying processing delay and neighbored multiple cell-specific SRS subframes.

It can be seen from the above embodiment that the base station may generate new DCI indicating SRS resource allocation and transmit the DCI, so that the user equipment configured to be in the CoMP transmission mode transmits an SRS by using the parameter configuration information indicated in the DCI, with the manner of configuration being simple and flexible and limited resources being efficiently used for transmitting SRSs; in this way, the base station side may decide that multiple transmission points receive SRSs at the same time as demanded by downlink CoMP transmission, and efficiently estimate information on channels between the user equipment and multiple transmission points.

Figure 7:
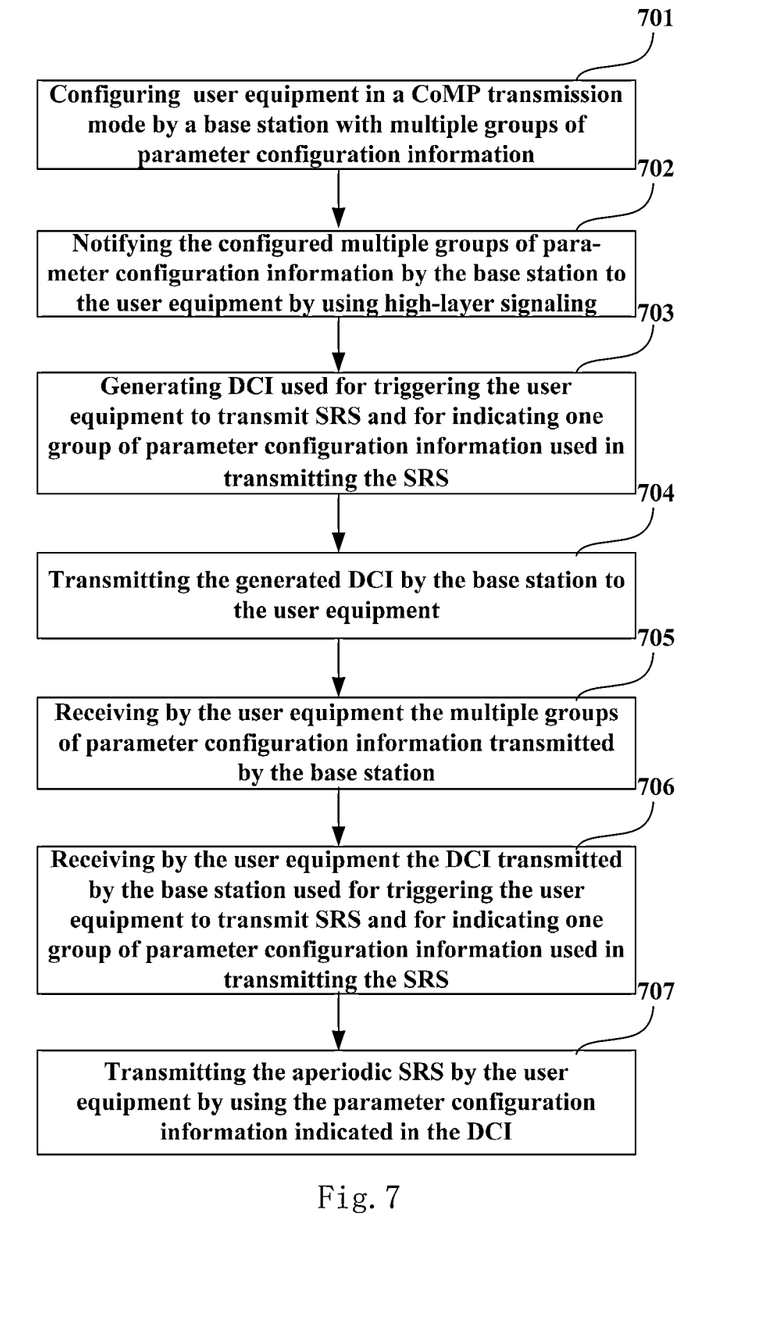
FIG. 7 is a flowchart of the method for transmitting SRS of Embodiment 4 of the present invention.

FIG. 7 is a flowchart of the method for transmitting uplink SRS of Embodiment 4 of the present invention. As shown in FIG. 7, at a base station side, the method includes:

step 701: configuring, by a base station, user equipment in a CoMP transmission mode with multiple groups of parameter configuration information;

wherein, the parameter configuration information is similar to that in Embodiment 2, which shall not be described herein any further.

In this embodiment, the configured multiple groups of parameter configuration information and indication information may be stored correspondingly; as shown in Table 6, three groups of parameter configuration information are configured:

TABLE 6

| 'XY' | SRS cycle | SRS comb | SRS bandwidth | SRS sequence | SRS power control | SRS cyclic shift | SRS transmission duration |
|---|---|---|---|---|---|---|---|
| '00' | \ | \ | \ | \ | \ | \ | \ |
| '01' | C1 | C2 | C3 | C4 | C5 | C6 | C7 |
| '10' | D1 | D2 | D3 | D4 | D5 | D6 | D7 |
| '11' | E1 | E2 | E3 | E4 | E5 | E6 | E7 | step 702: notifying, by the base station, the configured multiple groups of parameter configuration information to the user equipment;

In this embodiment, the base station may notify the configured multiple groups of parameter configuration information to the user equipment by using high-layer signaling, such as RRC signaling;

wherein, the SRS parameter configuration high-layer signaling overhead in the CoMP transmission mode may be different from that in the non-CoMP transmission mode; Table 7 shows a SRS parameter configuration high-layer signaling in the non-CoMP transmission mode, and Table 8 shows a SRS parameter configuration high-layer signaling in the CoMP transmission mode.

In order to correctly receive the high-layer signaling, the user needs to be explicitly or implicitly configured to be in the CoMP transmission mode; and when the user is in the CoMP transmission mode, it receives according to Table 8, and when the user is in the non-CoMP transmission mode, it receives according to Table 7.

TABLE 7

| SoundingRS-UL-ConfigDedicatedAperiodic-r11 ::= | CHOICE{ |
|---|---|
| release | NULL, |
| setup | SEQUENCE { |
| srs-ConfigIndexAp-r10 | INTEGER (0..1023), |
| srs-ConfigApDCI-Format4-r10 | SEQUENCE (SIZE (1..3)) OF SRS-ConfigAp-r11, |
| srs-ActivateAp-r10 | CHOICE { |
| release | NULL, |
| setup | SEQUENCE { |
| srs-ConfigApDCI-Format0-r10 | SRS-ConfigAp-r11, |
| srs-ConfigApDCI-Format1a-r10 | SRS-ConfigAp-r11   OPTIONAL -- Cond |
| TDD | |
| SRS-ConfigAp-r11 ::= SEQUENCE { | |
| srs-AntennaPortAp-r10 | ENUMERATED {an1, an2, an4, spare1}, |
| srs-BandwidthAp-r10 | ENUMERATED {bw0, bw1, bw2, bw3}, |
| durationAp-r10 | BOOLEAN, |
| freqDomainPositionAp-r10 | INTEGER (0..23), |
| transmissionCombAp-r10 | INTEGER (0..1), |
| cyclicShiftAp-r10 | ENUMERATED {cs0..cs7}, PTIONAL |

TABLE 8

| SoundingRS-UL-ConfigDedicatedAperiodic-r11 ::= | CHOICE{ |
|---|---|
| release | NULL, |
| setup | SEQUENCE { |
| srs-ConfigIndexAp-r11 | INTEGER (0..1023), |
| srs-ConfigApDCI-Format4-r11 | SEQUENCE (SIZE (1..3)) OF SRS-ConfigAp-r11, |
| srs-ActivateAp-r11 | CHOICE { |
| release | NULL, |
| setup | SEQUENCE { |
| srs-ConfigApDCI-Format0-r11 | SRS-ConfigAp-r11, |
| srs-ConfigApDCI-Format1a-r11 | SRS-ConfigAp-r11   OPTIONAL -- Cond |
| TDD | |
| SRS-ConfigAp-r11 ::= SEQUENCE { | |
| srs-AntennaPortAp-r11 | ENUMERATED {an1, an2, an4, spare1}, |
| srs-BandwidthAp-r11 | ENUMERATED {bw0, bw1, bw2, bw3}, |

TABLE 8-continued

| | |
|---|---|
| durationAp-r11 | ENUMERATED {du0, du1, du2, du3}, -- Cond DL CoMP |
| freqDomainPositionAp-r11 | INTEGER (0..23), |
| transmissionCombAp-r11 | INTEGER (0..M), OPTIONAL -- Cond DL CoMP |
| cyclicShiftAp-r11 | ENUMERATED {cs0..csN},OPTIONAL -- Cond DL CoMP |

In this embodiment, the base station may correspondingly store the multiple groups of parameter configuration information and corresponding indication information, and notify the mapping relationship shown in Table 6 to the user equipment and store it at the user equipment side;

It can be seen from Table 6 that when the indication information 'XY'='01'/'10'/'11', it indicates that the user equipment transmits aperiodic SRSs at a preset time, and it further indicates which group of parameter configuration information is used. The configured parameter configuration information may be different from a parameter value in the non-CoMP transmission mode.

step 703: generating, by the base station, DCI used for triggering the user equipment to transmit SRS and for indicating one group of parameter configuration information used in transmitting the SRS.

In this embodiment, the base station generates the DCI, the DCI including indication information indicative of whether the user equipment transmits an aperiodic SRS and one group of parameter configuration information used in transmitting the aperiodic SRS, and the process of generating the DCI is similar to that in the prior art, which shall not be described herein any further.

wherein, for example, if the indication information is "00", it indicates that no aperiodic SRS is transmitted, and if the indication information is "01", it indicates that an aperiodic SRS is transmitted and the used parameter configuration information is the first group of parameters.

step 704: transmitting, by the base station, the DCI to the user equipment.

In this way, when the user equipment receives the DCI, it may determine whether to transmit an aperiodic SRS according to the indication information contained in the DCI and a prestored mapping relationship between indication information and parameter configuration information (such as that shown in Table 6), and in case of transmitting the SRS, determine one group of parameter configuration information that is used.

It can be seen from the above embodiment that the base station may notify the user equipment of the configured multiple groups of parameter configuration information by using high-layer signaling, generate DCI to trigger the transmission of the aperiodic SRS, and indicate one group of parameter configuration information that is used, so that the user equipment entered into the CoMP transmission mode uses the parameter configuration information indicated in the DCI to transmit the SRS.

At the user equipment side, step 705: receiving, by the user equipment, the multiple groups of parameter configuration information transmitted by the base station.

In this embodiment, the user equipment stores the multiple groups of parameter configuration information and the indication information correspondingly, as shown in FIG. 6.

step 706: receiving, by the user equipment, the DCI transmitted by the base station used for triggering the user equipment to transmit SRS and for indicating one group of parameter configuration information used in transmitting the SRS; the DCI including indication information indicative of whether the user equipment transmits an aperiodic SRS and one group of parameter configuration information used in transmitting the aperiodic SRS; for example, if the indication information is "01", the user equipment may learn that an aperiodic SRS needs to be transmitted, and the used parameter configuration information is the first group of parameters.

step 707: transmitting, by the user equipment, the aperiodic SRS by using the parameter configuration information indicated in the DCI.

wherein, the manner of transmitting the aperiodic SRS is similar to that in Embodiment 3.

It can be seen from the above embodiment that the base station configures multiple groups of parameter configuration information for transmitting SRSs by using high-layer signaling, trigger the user equipment to transmit an aperiodic SRS by using the DCI and indicate one group of parameter configuration information that is used, so that the user equipment entered into the CoMP transmission mode uses the indicated one group of parameter configuration information to transmit the SRS, with the manner of configuration being simple and flexible and limited resources being efficiently used for transmitting SRSs; in this way, the base station side may decide that multiple transmission points receive SRSs at the same time as demanded by downlink CoMP transmission, and efficiently estimate information on channels between the user equipment and multiple transmission points.

It should be appreciated by those skilled in the art that part or all of the steps in the methods of the above embodiments may be carried out by related hardware instructed by a program, and the program may be stored in a computer-readable storage medium. And in executing the program, all or part of the steps in the methods of the above embodiments may be included, and the storage medium may comprise an ROM, an RAM, a floppy disk, or a CD, etc.

An embodiment of the present invention further provides a base station and user equipment, as described in the embodiments below. As the principle of the base station and user equipment for solving problem is similar to that of the above-described method for transmitting SRS based on a base station and user equipment, the implementation of the method may be referred to for the implementation of the base station and user equipment, and the repeated parts shall not be described any further.

Figure 8:
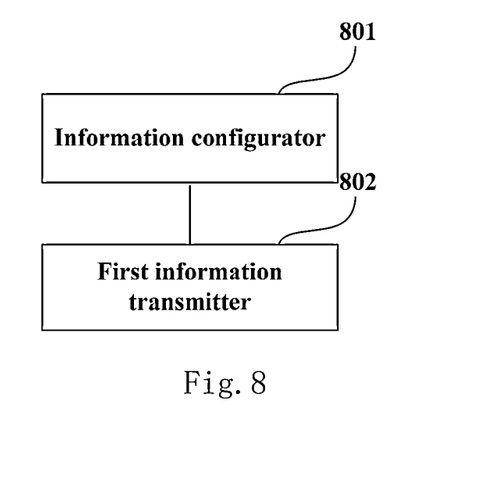
FIG. 8 is a schematic diagram of the structure of the base station of Embodiment 5 of the present invention.

FIG. 8 is a schematic diagram of the structure of the base station of Embodiment 5 of the present invention. As shown in FIG. 8, the base station includes an information configurator 801 and a first information transmitter 802; wherein, the information configurator 801 is configured to configure, user equipment entered a CoMP transmission mode, with parameter configuration information for transmitting SRS, the parameter configuration information including a frequency comb of the SRS and one or more pieces of the following information: cyclic shift, root sequence information, power control information, and transmission duration information, of the SRS;

and the first information transmitter 802 is configured to transmit the parameter configuration information to the user equipment, such that the user equipment transmits the SRS to the base station according to the parameter configuration information.

In this embodiment, for the CoMP transmission mode, the parameter configuration information may be different from a parameter of an SRS in a non-CoMP transmission mode; furthermore, root sequence information of SRSs of user equipment of different CoMP sets within the same cell may be different, and root sequence information of SRSs of user equipment of the same CoMP set within the same cell may be identical.

Furthermore, the transmission duration may be set as multiple, thereby improving the accuracy of channel measurement.

It can be seen from the above embodiment that the base station side configures the user equipment entered a CoMP transmission mode with parameter configuration information for transmitting an SRS, thereby efficiently using limited SRS resources and solving the problem in the prior art, with the manner of configuration being simple and flexible.

Figure 9:
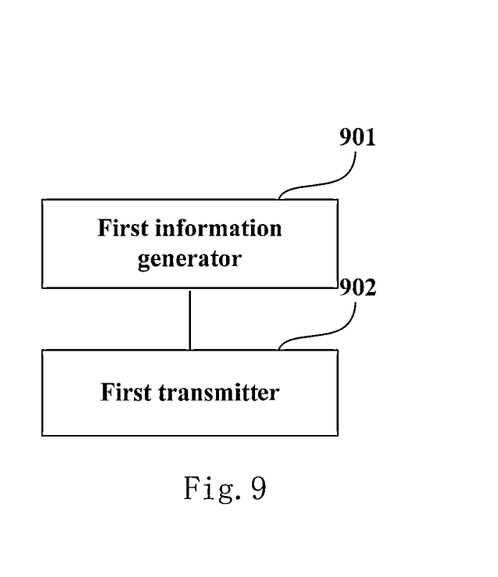
FIG. 9 is a schematic diagram of the structure of the first information generator of Embodiment 5 of the present invention.

In this embodiment, the base station may trigger the transmission of the SRS and indicate the parameter configuration information to the user equipment by generating new DCI indicative of parameter configuration. In such a case, as shown in FIG. 9, the first information transmitter 802 includes:

a first information generator 901 configured to generate DCI indicative of SRS resource allocation, the DCI containing indication information corresponding to the parameter configuration information and identification information for identifying the DCI; and a first transmitter 902 configured to transmit the DCI to the user equipment.

In this way, the user equipment configured to be in the CoMP transmission mode receives the DCI transmitted by the base station, learns the parameter configuration information according to the information indicated in the DCI, and transmits the SRS according to the parameter configuration information, thereby efficiently using limited SRS resources and solving the problem in the prior art, with the manner of configuration being simple and flexible.

In another embodiment, the base station may notify the parameter configuration information by using specific high-layer signaling designed for user equipment operating in the CoMP mode, trigger the transmission of the SRS by using DCI and indicate the parameter configuration information to the user equipment. In such a case, the information configurator 801 is configured to configure multiple groups of parameter configuration information, and the first information transmitter 802 is configured to transmit the multiple groups of parameter configuration information to the user equipment by using high-layer signaling.

Furthermore, the base station includes a second information generator and a second transmitter (not shown); wherein, the second information generator is configured to generate DCI used for triggering the user equipment to transmit SRS and for indicating one group of parameter configuration information used in transmitting the SRS, and the second transmitter is configured to transmit to the user equipment the DCI generated by the second information generator. Wherein, the process of generating the DCI by the second information generator is similar to the prior art, which shall not be described herein any further.

In this way, the user equipment configured to be in the CoMP transmission mode receives the multiple groups of parameter configuration information transmitted by the base station, stores the multiple groups of parameter configuration information and the indication information correspondingly, and in receiving the DCI transmitted by the base station triggering the user equipment to transmit an SRS and indicating one group of parameter configuration information used in transmitting the SRS, uses the indicated one group of parameter configuration information to transmit an aperiodic SRS.

Figure 10:
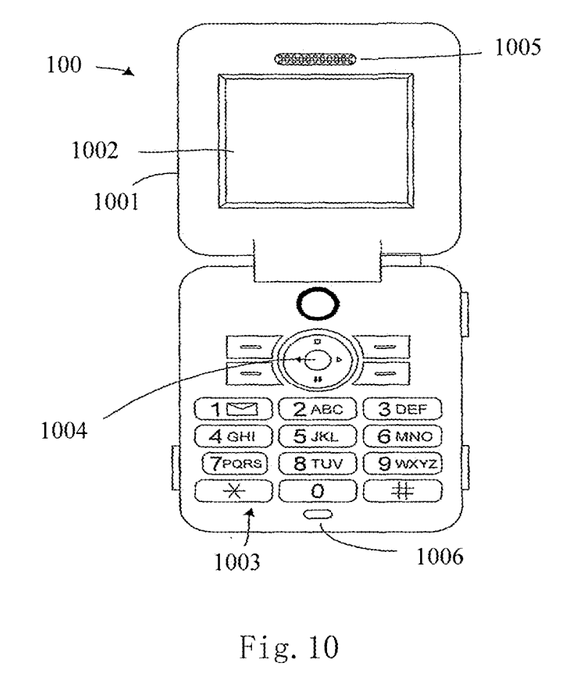
FIG. 10 is a schematic diagram of a mobile phone used as an example of user equipment.

FIG. 10 is a schematic diagram of a mobile phone used as an example of user equipment. Examples of the user equipment are not limited to a mobile phone. And the user equipment may also be any devices capable of communicating, such as a game player, a PDA, and a portable computer, etc.

As shown in FIG. 10, the mobile phone 100 may be a flip-lid phone having a flip lid 1101 movable between an open position and a closed position. In FIG. 10, the flip lid 1101 is shown as being in the open position. It should understood that the mobile phone 100 may also be of other structures, such as a "bar phone" or a "slide-lip phone" structure.

The mobile phone 100 may comprise a display 1002. The display 1002 displays such information to a user as an operational state, time, phone number, telephone directory information, and various menus, etc., so that the user is enabled to use various characteristics of the mobile phone 100. The display 1002 may also be used to visibly display contents received by the mobile phone 100 and/or retrieved from a memory (not shown) of the mobile phone 100. The display 1002 may be used to display images, videos and other graphics to a user, such as photos, mobile TV contents and videos related to games, etc.

A keyboard 1003 provides multiple user input operations. For example, the keyboard 1003 may comprise an alphanumeric key permitting input of alphanumeric information (such as a phone number, a phone list, telephone directory information, a notebook, and a text, etc.). Furthermore, the keyboard 1003 may comprise specific functional keys 1004, such as a "call transmit" key to initiate a call or respond a call, and a "call end" key to end or "hang up" a call. The specific functional keys may further comprise a menu navigation key and a selection key on the menu of the display 1002 for convenient navigation. For example, a pointing device and/or a navigation key may be provided to receive directional input from a user. Furthermore, the display 1002 and the keyboard 1003 may be combined in use for carrying out a function of a soft key. The mobile phone 100 may further comprise parts necessary for carrying out its functions, such as an antenna, a microcontroller, a loudspeaker 1005, and a microphone 1006, etc.

Figure 11:
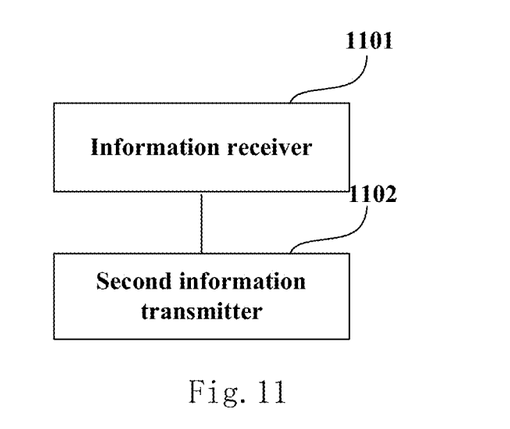
FIG. 11 is a schematic diagram of the structure of the user equipment of Embodiment 6 of the present invention.

FIG. 11 is a schematic diagram of the structure of the user equipment of Embodiment 6 of the present invention. As shown in FIG. 11, when the user equipment 100 according to an embodiment of the present invention is configured to be in a CoMP transmission mode, the user equipment includes:

an information receiver 1101 configured to receive parameter configuration information transmitted by a base station, the parameter configuration information including a frequency comb of a SRS and one or more pieces of the following information: cyclic shift, root sequence information, power control information, and transmission duration information, of the SRS; and a second information transmitter 1102 configured to transmit SRS to the base station according to the parameter configuration information.

In this embodiment, the base station may trigger the transmission of the SRS and indicate the parameter configuration information to the user equipment by generating new DCI indicative of parameter configuration. In such a case, the information receiver 1101 may be configured to detect the DCI transmitted by the base station to obtain the indication information contained in the DCI, and obtain the parameter configuration information according to the indication information and mapping relationship between indication information and parameter configuration information.

In this embodiment, the base station may notify the parameter configuration information by using specific high-layer signaling designed for user equipment operating in the CoMP mode, trigger the transmission of the SRS by using DCI and indicate the parameter configuration information to the user equipment. In such a case, the information receiver 1101 may receive multiple groups of parameter configuration information transmitted by the base station. Furthermore, the user equipment may include a storage unit (not shown) configured to store the above multiple groups of parameter configuration information. And the information receiver 1101 may further be configured to receive DCI transmitted by the base station used for triggering the user equipment to transmit an aperiodic SRS and for indicating one group of parameter configuration information that is used, so as to obtain the group of parameter configuration information that is used according to the indication information.

It can be seen from the above embodiment that the base station may trigger the transmission of the SRS and indicate the parameter configuration information to the user equipment by generating new DCI indicative of parameter configuration, or the base station may notify the parameter configuration information by using specific high-layer signaling designed for user equipment operating in the CoMP mode, trigger the transmission of the SRS by using DCI and indicate the parameter configuration information to the user equipment. In this way, limited SRS resources may be efficiently used, with the manner of configuration being flexible and simple.

An embodiment of the present invention further provides a computer-readable program, wherein when the program is executed in a base station, the program enables a computer to carry out the method for transmitting SRS as described in embodiments 1, 3 and 4 in the base station.

An embodiment of the present invention further provides a storage medium in which a computer-readable program is stored, wherein the computer-readable program enables a computer to carry out the method for transmitting SRS as described in embodiments 1, 3 and 4 in a base station.

An embodiment of the present invention further provides a computer-readable program, wherein when the program is executed in user equipment, the program enables a computer to carry out the method for transmitting SRS as described in embodiments 2, 3 and 4 in the user equipment.

An embodiment of the present invention further provides a storage medium in which a computer-readable program is stored, wherein the computer-readable program enables a computer to carry out the method for transmitting SRS as described in embodiments 2, 3 and 4 in user equipment.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A method for transmitting sounding reference symbol, comprising:
    configuring, by a base station, user equipment of a coordinated multiple point transmission mode, with parameter configuration information for transmitting sounding reference symbol, the parameter configuration information including a frequency comb of the sounding reference symbol and one or more pieces of the following information: cyclic shift, root sequence information, power control information, and transmission duration information, of the sounding reference symbol; and
    transmitting, by the base station, the parameter configuration information to the user equipment, such that the user equipment transmits the sounding reference symbol to the base station according to the parameter configuration information;
    wherein when the parameter configuration information includes the root sequence information, the root sequence information of the sounding reference symbols of the user equipment of one coordinated multiple point set within one cell is different from the root sequence information of the sounding reference symbols of the user equipment of another coordinated multiple point set within the same one cell, and the root sequence information of the sounding reference symbols of the user equipment of one coordinated multiple point set within one cell is identical with the root sequence information of the sounding reference symbols of the user equipment of the same one coordinated multiple point set within the same one cell.

2. The method according to claim 1, wherein a parameter value of the parameter configuration information is different from a parameter value of parameter configuration information of a non-coordinated multiple point transmission mode.

3. The method according to claim 1, wherein the transmitting the parameter configuration information to the user equipment by the base station comprises:
    generating, by the base station, downlink control information indicative of sounding reference symbol resource allocation, the downlink control information containing indication information corresponding to the parameter configuration information and identification information for identifying the downlink control information; and
    transmitting the downlink control information to the user equipment.

4. The method according to claim 1, wherein the parameter configuration information configured by the base station is in multiple groups; and
    the base station transmits the multiple groups of parameter configuration information to the user equipment by using high-layer signaling.

5. The method according to claim 4, wherein the method further comprises:
- generating downlink control information used for triggering the user equipment to transmit sounding reference symbol and for indicating one group of parameter configuration information used in transmitting the sounding reference symbol; and
- transmitting the downlink control information to the user equipment.

6. A base station, comprising:
- an information configurator, configured to configure, user equipment of a coordinated multiple point transmission mode, with parameter configuration information for transmitting sounding reference symbol, the parameter configuration information including a frequency comb of the sounding reference symbol and one or more pieces of the following information: cyclic shift, root sequence information, power control information, and transmission duration information, of the sounding reference symbol; and
- a first information transmitter, configured to transmit the parameter configuration information to the user equipment, such that the user equipment transmits the sounding reference symbol to the base station according to the parameter configuration information;
- wherein when the parameter configuration information includes the root sequence information, the root sequence information of the sounding reference symbols of the user equipment of one coordinated multiple point set within one cell is different from the root sequence information of the sounding reference symbols of the user equipment of another coordinated multiple point set within the same one cell, and the root sequence information of the sounding reference symbols of the user equipment of one coordinated multiple point set within one cell is identical with the root sequence information of the sounding reference symbols of the user equipment of the same one coordinated multiple point set within the same one cell.

7. The base station according to claim 6, wherein the first information transmitter comprises:
- a first information generator, configured to generate downlink control information indicative of sounding reference symbol resource allocation, the downlink control information containing indication information corresponding to the parameter configuration information and identification information for identifying the downlink control information; and
- a first transmitter, configured to transmit the downlink control information to the user equipment.

8. The base station according to claim 6, wherein the parameter configuration information configured by the base station is in multiple groups; and
- the first information transmitter is specifically configured to transmit the multiple groups of parameter configuration information to the user equipment by using high-layer signaling.

9. The base station according to claim 8, wherein the base station further comprises:
- a second information generator, configured to generate downlink control information used for triggering the user equipment to transmit sounding reference symbol and for indicating one group of parameter configuration information used in transmitting the sounding reference symbol; and
- a second transmitter, configured to transmit to the user equipment the downlink control information generated by the second information generator.

10. User equipment, configured to be in a coordinated multiple point transmission mode, the user equipment comprising:
- an information receiver, configured to receive parameter configuration information transmitted by a base station, the parameter configuration information including a frequency comb of a sounding reference symbol and one or more pieces of the following information: cyclic shift, root sequence information, power control information, and transmission duration information, of the sounding reference symbol; and
- a second information transmitter, configured to transmit sounding reference symbol to the base station according to the parameter configuration information;
- wherein when the parameter configuration information includes the root sequence information, the root sequence information of the sounding reference symbols of the user equipment of one coordinated multiple point set within one cell is different from the root sequence information of the sounding reference symbols of the user equipment of another coordinated multiple point set within the same one cell, and the root sequence information of the sounding reference symbols of the user equipment of one coordinated multiple point set within one cell is identical with the root sequence information of the sounding reference symbols of the user equipment of the same one coordinated multiple point set within the same one cell.

* * * * *